United States Patent
Gabrielov

(10) Patent No.: US 10,189,015 B2
(45) Date of Patent: Jan. 29, 2019

(54) HYDROPROCESSING CATALYST COMPOSITION CONTAINING AN ACETOACETIC ACID COMPOUND, A METHOD OF MAKING SUCH A CATALYST, AND A PROCESS OF USING SUCH CATALYST

(71) Applicant: SHELL OIL COMPANY, Houston, TX (US)

(72) Inventor: Alexei Grigorievich Gabrielov, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/918,613

(22) Filed: Oct. 21, 2015

(65) Prior Publication Data

US 2016/0114315 A1    Apr. 28, 2016

Related U.S. Application Data

(60) Provisional application No. 62/066,935, filed on Oct. 22, 2014.

(51) Int. Cl.

| | | |
|---|---|---|
| B01J 31/02 | (2006.01) | |
| B01J 37/02 | (2006.01) | |
| C10G 45/08 | (2006.01) | |
| B01J 31/28 | (2006.01) | |
| B01J 31/34 | (2006.01) | |
| B01J 37/28 | (2006.01) | |
| B01J 21/04 | (2006.01) | |

(Continued)

(52) U.S. Cl.
CPC ......... *B01J 31/0207* (2013.01); *B01J 21/04* (2013.01); *B01J 23/882* (2013.01); *B01J 31/28* (2013.01); *B01J 31/34* (2013.01); *B01J 35/1019* (2013.01); *B01J 35/1042* (2013.01); *B01J 35/1061* (2013.01); *B01J 37/0201* (2013.01); *B01J 37/0203* (2013.01); *B01J 37/0205* (2013.01); *B01J 37/28* (2013.01); *C10G 45/08* (2013.01); *C10G 2300/70* (2013.01)

(58) Field of Classification Search
CPC . B01J 23/28; B01J 23/75; B01J 23/883; B01J 31/02; B01J 31/0201; B01J 31/0205; B01J 31/0207; B01J 31/28; B01J 31/34; B01J 27/14; B01J 27/19; B01J 38/52; B01J 37/0203; C10G 45/08
See application file for complete search history.

(56) References Cited

U.S. PATENT DOCUMENTS

| | | |
|---|---|---|
| 5,338,717 A | 8/1994 | Aldridge et al. |
| 6,090,745 A | 7/2000 | DuBois et al. |
| 6,540,908 B1 | 4/2003 | Eijsbouts et al. |

(Continued)

FOREIGN PATENT DOCUMENTS

| | | |
|---|---|---|
| EP | 2650049 | 6/2012 |
| WO | 2011036862 | 3/2011 |

*Primary Examiner* — Brian A McCaig
(74) *Attorney, Agent, or Firm* — Charles W. Stewart

(57) ABSTRACT

A composition that comprises a support material having incorporated therein a metal component and impregnated with an additive compound that is an acetoacetic acid compound. The composition includes the support material that is impregnated with the additive compound and is useful in the hydroprocessing of hydrocarbon feedstocks, especially in the denitrogenation and desulfurization of distillate feedstocks to make ultra low sulfur diesel.

10 Claims, 1 Drawing Sheet

(51) Int. Cl.
B01J 23/882 (2006.01)
B01J 35/10 (2006.01)

(56) References Cited

U.S. PATENT DOCUMENTS

| | | |
|---|---|---|
| 6,566,296 B2 | 5/2003 | Plantenga et al. |
| 6,872,678 B2 | 3/2005 | Eijsbouts |
| 8,262,905 B2 | 9/2012 | Gabrielov et al. |
| 2013/0008829 A1 | 1/2013 | Marchand et al. |
| 2013/0267409 A1 | 10/2013 | Lee et al. |
| 2014/0305843 A1 | 10/2014 | Kraus et al. |

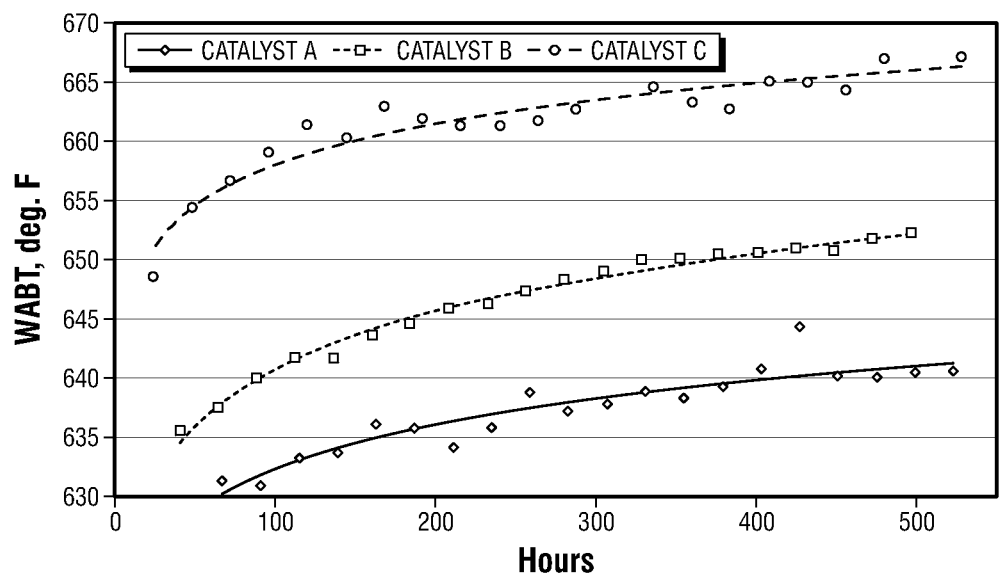

HYDROPROCESSING CATALYST COMPOSITION CONTAINING AN ACETOACETIC ACID COMPOUND, A METHOD OF MAKING SUCH A CATALYST, AND A PROCESS OF USING SUCH CATALYST

The present application claims priority to U.S. Provisional Application No. 62/066,935, filed on Oct. 22, 2014, the disclosure of which is incorporated herein by reference in its entirety.

This invention relates to a hydroprocessing catalyst composition that includes an acetoacetic acid compound in addition to its support material and metal components, a method of making such a hydroprocessing catalyst composition, and its use in the catalytic hydroprocessing of hydrocarbon feedstocks.

As a result of the very low sulfur concentration specifications for diesel fuels, there has been a great effort by those in industry to find new hydrotreating catalyst formulations and products that may be used in the manufacture of low-sulfur diesel and other products.

One catalyst taught by the art for use in the hydrotreating of certain hydrocarbon feedstocks so as to meet some of the more stringent sulfur regulations is disclosed in U.S. Pat. No. 5,338,717. In this patent, a hydrotreating catalyst is disclosed that is made by impregnating a Group VI (Mo and/or W) heteropolyacid onto a support followed by treating the impregnated support with an aqueous solution of a reducing agent that may be dried and thereafter impregnated with a Group VIII (Co and/or Ni) metal salt of an acid having an acidity of less than that of the Group VI heteropolyacid. This impregnated support is then dried and sulfided to provide a final catalyst.

The catalyst composition disclosed in the '717 patent may also be made by impregnating a support with both the Group VIII metal salt and the Group VI heteropolyacid followed by drying and then treating with a reducing agent, drying again, and sulfiding to form the final catalyst.

Another catalyst useful in the deep hydrodesulfurization and in other methods of hydrotreating hydrocarbon feedstocks and a method of making such catalyst and its activation are disclosed in U.S. Pat. No. 6,872,678. The catalyst of the '678 patent includes a carrier upon which a Group VIB hydrogenation metal component and/or a Group VIII hydrogenation metal component and a sulfur-containing organic compound additive are incorporated and further which has been contacted with a petroleum fraction organic liquid. The catalyst is treated with hydrogen either simultaneously with or after the incorporation of the organic liquid (petroleum fraction).

U.S. Pat. No. 8,262,905 discloses a composition that is particularly useful in the catalytic hydroprocessing of hydrocarbon feedstocks. One composition disclosed in the '905 patent includes a support material that is loaded with either an active metal precursor or a metal component of a metal salt, and hydrocarbon oil and a polar additive. The polar additive has a dipole moment of at least 0.45 and the weight ratio of hydrocarbon oil to polar additive in the composition is in the range of upwardly to 10:1. It is particularly desirable for the polar additive to be a heterocompound except those heterocompounds that include sulfur. The most preferred polar additive compounds are selected from the group of amide compounds.

U.S. Pat. No. 6,540,908 discloses a process for preparing a sulfided hydrotreating catalyst. This process involves combining a catalyst carrier of alumina and a hydrogenation metal catalyst carrier with an organic compound that includes a covalently bonded nitrogen atom and a carbonyl moiety followed by sulfiding the resulting combination. The '908 patent does not explicitly teach or exemplify that its organic compound can include a heterocyclic compound. A preferred organic compound is indicated to be one that satisfies the formula (R1R2)N—R3-N(R1'R2').

U.S. Pat. No. 6,566,296 discloses a process for preparing a catalyst composition having at least one Group VIII metal component and at least two Group VIB metal components that are combined and reacted in the presence of a protic liquid. An organic oxygen-containing additive is added prior to, during or subsequent to the combining and reacting of the metal components. The organic oxygen-containing additive is one that has at least one carbon atom, at least on hydrogen atom, and at least one oxygen additive. There is no suggestion in the '296 patent that the organic oxygen-containing additive may be an acetoacetic acid compound.

U.S. Patent Pub. No. US 2013/0267409 discloses a hydroprocessing catalyst comprising hydrogenation metal components and an organic compound of the following formula 1: $R_1COCH_2COR_2$, wherein, R1 and R2 are the same or different from each other, and are one of the following C1 to C12 alkyl, C6 to C12 allyl, C1 to C12 alkoxy and hydroxyl; or an organometallic compound of the following Formula 2: $X(R_1COCH_1COR_2)_n$, wherein, X is selected from the metals of Group VIB, VIIB, and VIII, R1 and R2 have the same meaning as above, and n is an integer of 1 to 6.

There is an ongoing need to find improved higher activity hydrotreating catalysts. There is also a need to find more economical manufacturing methods and improved methods of activating hydrotreating catalysts so as to provide catalysts having better activity than catalysts activated by alternative methods.

Accordingly, provided is a catalyst composition that comprises a support material that is loaded with an active metal precursor and an acetoacetic acid compound as an additive. In another embodiment of the invention, the catalyst composition comprises a support material containing a metal component of a metal salt solution and an acetoacetic acid compound.

The inventive catalyst composition may be made by one of several embodiments of the inventive preparation method. One such embodiment comprises incorporating a metal-containing solution into a support material to provide a metal-incorporated support material; and incorporating an additive comprising, an acetoacetic acid compound, into the metal-incorporated support material to thereby provide an additive-impregnated composition.

The catalyst composition of the invention is particularly useful in the hydroprocessing of hydrocarbon feedstocks and may be used in an inventive hydrotreating process of contacting under suitable hydrotreating process conditions the hydrocarbon feedstock with the catalyst composition to yield a treated product.

FIG. 1 presents the hydrodesulfurization (HDS) activity, i.e., the weighted average bed temperature (WABT) required to achieve a 10 ppmw sulfur concentration in the diesel product when processing a straight run gas oil feed to yield an ultra-low sulfur diesel product as a function of time-on-stream (TOS) for a comparison catalyst having as its additive DMF and oil and for three inventive catalysts having as their additive either proypylene carbonate or an acetoacetic acid compound.

The composition of the invention is one which is particularly useful in the catalytic hydroprocessing of petroleum or other hydrocarbon feedstocks, or the composition of the invention is one which is convertible by the treatment with hydrogen or a sulfur compound, or both, into a catalyst composition having particularly good catalytic properties in the hydroprocessing of hydrocarbon feedstocks.

It is a significant feature of the inventive composition that, by using an acetoacetic acid compound selected from a specifically defined group of acetoacetic acid compounds, as more fully described elsewhere herein, to impregnate its support material that includes, among other components, a catalytic metal, a composition is provided having certain catalytic properties that are enhanced over alternative catalyst compositions. The inventive composition has been found to have enhanced catalytic properties over those of certain catalyst compositions prepared by using a mixture of a polar additive and hydrocarbon oil.

Another beneficial attribute of the invention is that the composition does not need to be calcined or to have sulfur added to it prior to its placement into a reactor vessel or within a reactor system for use in either hydrodesulfurization or hydrodenitrogenation of a hydrocarbon feedstock. This feature provides the particular benefit of significantly reducing certain costs that are associated with manufacturing and treatment of the composition, and it allows for the use of in situ activation methods that yield a catalyst composition which exhibits significantly improved hydrodesulfurization or hydrodenitrogenation, or both, catalytic activity over certain other hydrotreating catalyst compositions.

The composition of the invention further allows for an improved procedure in the start-up of hydrotreating reactor systems.

The composition of the invention includes a support material that has incorporated therein or is loaded with a metal component, which is or can be converted to a metal compound having activity towards the catalytic hydrogenation of organic sulfur or organic nitrogen compounds. Thus, it has application in the hydrotreating of hydrocarbon feedstocks.

The support material that contains the metal component further has incorporated therein an acetoacetic acid compound as an additive to thereby provide the additive-impregnated composition of the invention.

The support material of the inventive composition can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina.

In the preparation of various embodiments of the inventive composition, the metal component of the composition may be incorporated into the support material by any suitable method or means providing for loading or incorporating into the support material an active metal precursor. Thus, the composition includes the support material and a metal component.

One method of incorporating the metal component into the support material, includes, for example, co-mulling the support material with the active metal or metal precursor to yield a co-mulled mixture of the two components. Or, another method includes the co-precipitation of the support material and metal component to form a co-precipitated mixture of the support material and metal component. Or, in a preferred method, the support material is impregnated with the metal component using any of the known impregnation methods, such as, incipient wetness, to incorporate the metal component into the support material.

When using an impregnation method to incorporate the metal component into the support material, it is preferred for the support material to be formed into a shaped particle comprising an inorganic oxide material and thereafter loaded with an active metal precursor, preferably, by the impregnation of the shaped particle with an aqueous solution of a metal salt to give the support material containing a metal of a metal salt solution.

To form the shaped particle, the inorganic oxide material, which preferably is in powder form, is mixed with water and, if desired or needed, a peptizing agent and/or a binder to form a mixture that can be shaped into an agglomerate. It is desirable for the mixture to be in the form of an extrudable paste suitable for extrusion into extrudate particles, which may be of various shapes such as cylinders, trilobes, etc. and nominal sizes such as 1/16", 1/8", 3/16", etc. The support material of the inventive composition, thus, preferably, is a shaped particle comprising an inorganic oxide material.

The shaped particle is then dried under standard drying conditions that can include a drying temperature in the range of from 50° C. to 200° C., preferably, from 75° C. to 175° C., and, most preferably, from 90° C. to 150° C.

After drying, the shaped particle is calcined under standard calcination conditions that can include a calcination temperature in the range of from 250° C. to 900° C., preferably, from 300° C. to 800° C., and, most preferably, from 350° C. to 600° C.

The calcined shaped particle can have a surface area (determined by the BET method employing $N_2$, ASTM test method D 3037) that is in the range of from 50 $m^2/g$ to 450 $m^2/g$, preferably from 75 $m^2/g$ to 400 $m^2/g$, and, most preferably, from 100 $m^2/g$ to 350 $m^2/g$.

The mean pore diameter in angstroms (Å) of the calcined shaped particle is in the range of from 50 to 200, preferably, from 70 to 150, and, most preferably, from 75 to 125.

The pore volume of the calcined shaped particle is in the range of from 0.5 cc/g to 1.1 cc/g, preferably, from 0.6 cc/g to 1.0 cc/g, and, most preferably, from 0.7 to 0.9 cc/g.

Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the calcined shaped particle is impregnated in one or more impregnation steps with a metal component using one or more aqueous solutions containing at least one metal salt wherein the metal compound of the metal salt solution is an active metal or active metal precursor.

The metal elements are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) is also a desired metal component.

For the Group 9 and 10 metals, the metal salts include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both.

For the Group 6 metals, the metal salts include Group 6 metal oxides or sulfides. Preferred are salts containing the Group 6 metal and ammonium ion, such as ammonium heptamolybdate and ammonium dimolybdate.

The concentration of the metal compounds in the impregnation solution is selected so as to provide the desired metal content in the final composition of the invention taking into consideration the pore volume of the support material into which the aqueous solution is to be impregnated and the amounts of acetoacetic acid compound additive that is later to be incorporated into the support material that is loaded with a metal component. Typically, the concentration of metal compound in the impregnation solution is in the range of from 0.01 to 100 moles per liter.

The metal content of the support material having a metal component incorporated therein may depend upon the application for which the additive-impregnated composition of the invention is to be used, but, generally, for hydroprocessing applications, the Group 9 and 10 metal component, i.e., cobalt or nickel, can be present in the support material having a metal component incorporated therein in an amount in the range of from 0.5 wt. % to 20 wt. %, preferably from 1 wt. % to 15 wt. %, and, most preferably, from 2 wt. % to 12 wt. %.

The Group 6 metal component, i.e., molybdenum or tungsten, preferably, molybdenum, can be present in the support material having a metal component incorporated therein in an amount in the range of from 5 wt. % to 50 wt. %, preferably from 8 wt. % to 40 wt. %, and, most preferably, from 12 wt. % to 30 wt. %.

The above-referenced weight percents for the metal components are based on the dry support material and the metal component as the element regardless of the actual form of the metal component.

To provide the additive-impregnated composition of the invention, the acetoacetic acid compound additive is incorporated into the support material that also has incorporated therein, as described above, the active metal precursor. The acetoacetic acid compound additive is used to fill a significant portion of the available pore volume of the pores of the support material, which is already loaded with the active metal precursor, to thereby provide a composition that comprises, or consists essentially of, or consists of, a support material containing a metal component and an acetoacetic acid compound additive.

The preferred method of impregnating the metal loaded support material may be any standard well-known pore fill methodology whereby the pore volume is filled by taking advantage of capillary action to draw the liquid into the pores of the metal loaded support material. It is desirable to fill at least 75% of the pore volume of the metal loaded support material with the acetoacetic acid compound additive. It is preferred for at least 80% of the pore volume of the metal loaded support material to be filled with the acetoacetic acid compound additive, and, most preferred, at least 90% of the pore volume is filled with the acetoacetic acid compound additive.

The composition may be installed, as is, into a reactor vessel or within a reactor system that is to undergo a start-up procedure in preparation of or prior to the introduction of a sulfiding feed that can include a sulfiding agent or a hydrocarbon feedstock containing a concentration of an organic sulfur compound.

It is a significant aspect of the invention that the support material loaded with an active metal precursor is not calcined or sulfided prior to its loading into a reactor vessel or system for its ultimate use as a hydrotreating catalyst but that it can be sulfided, in situ, in a delayed feed introduction start-up procedure. The delayed feed introduction start-up procedure is hereinafter more fully described. Moreover, it has been determined that an improvement in catalytic activity is obtainable when, prior to hydrogen treatment and sulfiding, the support material loaded with the active metal precursor is filled with the acetoacetic acid compound additive. Thus, not only are certain economic benefits realized by eliminating, or at least not incurring, the costs associated with calcination and sulfidation of the catalyst prior to its delivery and use, but also a more active catalyst is obtained.

It has been found that the support material loaded with an active metal precursor that is impregnated with the acetoacetic acid compound additive before treatment with hydrogen followed by treatment with a sulfur compound provides for a hydrotreating catalyst having greater hydrodesulfurization and hydrodenitrogenation activities than the support material, loaded with an active metal precursor, but which has, instead, been impregnated with a mixture of a polar additive, such as dimethylformamide, and a hydrocarbon oil prior to the hydrogen and sulfur treatments.

In the preparation of the inventive composition, any suitable method or means may be used to impregnate the metal loaded support material with the acetoacetic acid compound additive. The preferred method of impregnation may be any standard well-known pore fill methodology whereby the pore volume is filled by taking advantage of capillary action to draw the liquid into the pores of the metal loaded support material. It is desirable to fill at least 75% of the pore volume of the metal loaded support material with the acetoacetic acid compound additive. It is preferred for at least 80% of the pore volume of the metal loaded support material to be filled with the acetoacetic acid compound additive, and, most preferred, at least 90% of the pore volume is filled with the acetoacetic acid compound additive.

In one embodiment of the invention, it is desirable for the catalyst composition to have a material absence of hydrocarbon oil. The hydrocarbon oil that is absent from the composition of this embodiment can include hydrocarbons having a boiling temperature in the range of from 100° C. to 550° C. and, more specifically, from 150° C. to 500° C. Possible hydrocarbon oils to be excluded from the support material may include crude oil distillate fractions, such as, for example, heavy naphtha, containing hydrocarbons boiling, perhaps, in the range of from 100° C. to 210° C., kerosene, diesel, and gas oil.

The more specific hydrocarbon oil that should be excluded in material amounts from the composition in this embodiment are those that include olefin compounds that are liquid at the elevated contacting temperature of the hydrogen-containing gaseous atmosphere during treatment therewith. Such olefins are those having a carbon number greater than 12 and, generally, having a carbon number in the range of from 12 to 40 carbons. More specifically, the olefin compounds are those having from 14 to 38 carbons, and, most specifically, the carbon number is in the range of from 16 to 36 carbons. The olefins may be in an admixture with non-olefinic hydrocarbons, such as alkanes or aromatic solvents or any of the above-referenced petroleum distillate fractions, such as, heavy naphtha, kerosene, diesel, and gas oil.

In view of the above, an embodiment of the inventive catalyst composition has a material absence of or an absence of a hydrocarbon oil, but, otherwise, the inventive catalyst composition comprises, or consists essentially of, or consists of, as support material containing a metal component either of a metal salt solution or an active metal precursor and an acetoacetic acid compound additive. The hydrocarbon oil can be either a mixture of hydrocarbons having a boiling temperature in the range of from 100° C. to 550° C. or from 150° C. to 500° C. or any of the olefins-containing hydrocarbon oils as described above.

What is meant herein by the use of the term "material absence" is that the amount of hydrocarbons present in the composition is such that it has no material effect upon the ultimate catalytic performance of the final catalyst composition of the invention either before or after its treatment with hydrogen or sulfur, or both. Thus, a material absence of the hydrocarbon from the composition may, however, allow for the presence of non-material amounts of hydrocarbons that have no effect upon catalyst performance.

In general, the olefin content of the hydrocarbon oil to be excluded in a material quantity is be above 5 wt. %, and, in certain instances, it can exceed 10 wt. %, or even exceed 30 wt. %. The olefin compounds may include monoolefins or they may include olefins with multiple carbon double bonds.

The acetoacetic acid compound that is used as an additive in the preparation of the inventive composition is any suitable acetoacetic acid-containing compound that provides for the benefits and has the characteristic properties as described herein. Thus, the acetoacetic acid compound additive of the composition is selected from the group of acetoacetic acid compounds having the following molecular structural formula:

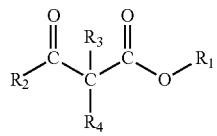

wherein, $R_1$ is either a hydrogen atom or an alkyl group having from 1 to 4 carbon atoms;

$R_2$ is an alkyl group having from 1 to 4 carbon atoms;

$R_3$ is either a hydrogen atom or an alkyl group having from 1 to 4 carbon atoms;

$R_4$ is either a hydrogen atom or an alkyl group having from 1 to 4 carbon atoms;

The above formula is also represented herein as: $R_1$—O—CO—$CR_3R_4$—CO—$R_2$.

Preferred additive compounds are those acetoacetic acid compounds selected from the group consisting of acetoacetic acid and esters of acetoacetic acid, such as, methyl acetoacetate, ethyl acetoacetate, propyl acetoacetate, and butyl acetoacetate. Among these, the most preferred are methyl acetoacetate and ethyl acetoacetate.

A particularly important aspect of the invention is for the support material having a metal component incorporated therein to be uncalcined and non-sulfided when it is impregnated with the acetoacetic acid compound additive. Cost savings in the preparation of the composition are realized by not having to perform the calcination or sulfidation steps. But, moreover, it has been found that, when the additive-impregnated composition is further subjected to a hydrogen treatment and sulfur treatment, the resulting catalyst composition exhibits enhanced catalytic activity.

Before the incorporation of the acetoacetic acid compound additive into the support material having a metal component incorporated therein, particularly when the metal component is added to the support material by impregnation using an aqueous solution of a metal salt (metal-impregnated support material), it is important for this metal-impregnated support material to be dried so as to remove at least a portion of the volatile liquid contained within the pores of the support material so as to provide pore volume that can be filled with the additive. The metal-impregnated support material, thus, is dried under drying conditions that include a drying temperature that is less than a calcination temperature.

A significant feature of the invention is that the drying temperature under which the drying step is conducted does not exceed a calcination temperature. Thus, the drying temperature should not exceed 400° C., and, preferably, the drying temperature at which the metal-impregnated support material is dried does not exceed 300° C., and, most preferably, the drying temperature does not exceed 250° C. It is understood that the drying step will, in general, be conducted at lower temperatures than the aforementioned temperatures, and, typically, the drying temperature will be conducted at a temperature in the range of from 60° C. to 150° C.

The drying of the metal-impregnated support material is preferably controlled in a manner so as to provide the resulting dried metal-impregnated support material having a volatiles content that is in a particular range. The volatiles content of the dried metal-impregnated support material should be controlled so that it does not exceed 20 wt. % LOI. The LOI, or loss on ignition, is defined as the percentage weight loss of the material after its exposure to air at a temperature of 482° C. for a period of two hours, which can be represented by the following formula: (sample weight before exposure less sample weight after exposure) multiplied by 100 and divided by (sample weight before exposure). It is preferred for the LOI of the dried metal-impregnated support material to be in the range of from 1 wt. % to 20 wt. %, and, most preferred, from 3 wt. % to 15 wt. %. The dried metal-impregnated support material is further impregnated with the acetoacetic acid compound additive as earlier described herein.

The additive-impregnated composition of the invention may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. As earlier noted, the additive-impregnated composition can first undergo a hydrogen treatment that is then followed with treatment with a sulfur compound.

The hydrogen treatment includes exposing the additive-impregnated composition to a gaseous atmosphere containing hydrogen at a temperature ranging upwardly to 250° C. Preferably, the additive-impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The additive-impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the additive-impregnated composition after it has been treated with hydrogen can be done using any conventional method known to those skilled in the art. Thus, the hydrogen treated additive-impregnated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS).

Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated additive-impregnated composition to their sulfided form. Typically, the sulfiding temperature at which the hydrogen treated additive-impregnated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated additive-impregnated composition is sulfided generally can be in the range of from 1 bar to 70 bar, preferably, from 1.5 bar to 55 bar, and, most preferably, from 2 bar to 35 bar.

As noted above, one of the benefits provided by the additive-impregnated composition of the invention is that it can be utilized in a reactor system that is started up using a so-called delayed feed introduction procedure. In the delayed feed introduction procedure, the reactor system, which includes a reactor vessel containing the additive-impregnated composition, first undergoes a heating step to raise the temperature of the reactor and the additive-impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the additive-impregnated composition, it is thereafter treated with a sulfur compound in the manner as earlier described herein.

It has been found that the hydrocarbon oil-containing composition, after undergoing the hydrogen treatment followed by treatment with a sulfur compound, exhibits a greater catalytic activity toward hydrodesulfurization of a distillate feedstock than do other similar, but non-impregnated compositions.

It is recognized that the additive-impregnated composition of the invention, after its treatment with hydrogen and sulfur, is a highly effective catalyst for use in the hydrotreating of hydrocarbon feedstocks. This catalyst is particularly useful in applications involving the hydrodesulfurization and hydrodenitrogenation of hydrocarbon feedstocks, and, especially, it has been found to be an excellent catalyst for use in the hydrodesulfurization of distillate feedstocks, in particular, diesel, to make an ultra-low sulfur distillate product having a sulfur concentration of less than 15 ppmw, preferably, less than 10 ppmw, and, most preferably, less than 8 ppmw.

In the hydrotreating applications, the additive-impregnated composition that is used in a delayed feed introduction procedure or otherwise treated with hydrogen and sulfur, as described above, is contacted under suitable hydrodesulfurization or hydrodenitrogenation, or both, conditions with a hydrocarbon feedstock that typically has a concentration of sulfur or nitrogen, or both.

The more typical and preferred hydrocarbon feedstock processed with the additive-impregnated composition is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrotreating process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw).

It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

Also, when referring herein to "sulfur content" or "total sulfur" or other similar reference to the amount of sulfur that is contained in a feedstock, product or other hydrocarbon stream, what is meant is the value for total sulfur as determined by the test method ASTM D2622-10, entitled "Standard Test Method for Sulfur in Petroleum Products by Wavelength Dispersive X-ray Fluorescence Spectrometry." The use of weight percent (wt. %) values of this specification when referring to sulfur content correspond to mass % values as would be reported under the ASTM D2622-10 test method.

The middle distillate feedstock may also have a concentration of nitrogen compounds. When it does have a concentration of nitrogen compounds, the nitrogen concentration may be in the range of from 15 parts per million by weight (ppmw) to 3500 ppmw. More typically for the middle distillate feedstocks that are expected to be handled by the process, the nitrogen concentration of the middle distillate feedstock is in the range of from 20 ppmw to 1500 ppmw, and, most typically, from 50 ppmw to 1000 ppmw.

When referring herein to the nitrogen content of a feedstock, product or other hydrocarbon stream, the presented concentration is the value for the nitrogen content as determined by the test method ASTM D5762-12 entitled "Standard Test Method for Nitrogen in Petroleum and Petroleum Products by Boat-Inlet Chemiluminescence." The units used in this specification, such as ppmw or wt. %, when referring to nitrogen content are the values that correspond to those as reported under ASTM D5762, i.e., in micrograms/gram (μg/g) nitrogen, but converted into referenced unit.

The additive-impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems.

The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrotreating process (either hydrodenitrogenation or hydrodesulfurization, or both) generally operates at a hydrotreating reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrotreating reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.).

It is recognized that one of the unexpected features of the use of the inventive additive-impregnated composition of the invention is that, in a delayed feed introduction application, the resultant catalyst has a significantly higher catalytic activity than certain other alternative catalyst compositions, and, thus, it will, in general, provide for comparatively lower required process temperatures for a given amount of desulfurization or denitrogenation.

The flow rate at which the distillate feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05 $hr^{-1}$ to 5 $hr^{-1}$, more preferably, from 0.1 $hr^{-1}$ to 3 $hr^{-1}$. and, most preferably, from 0.2 $hr^{-1}$ to 2 $hr^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

If the hydrotreated distillate product yielded from the process of the invention has a reduced nitrogen concentration relative to the distillate feedstock, it typically is at a concentration that is less than 50 ppmw, and, preferably, the nitrogen concentration is less than 20 ppmw or even less than 15 or 10 ppmw.

The following examples are presented to further illustrate certain aspects of the invention, but they are not to be construed as limiting the scope of the invention.

EXAMPLE 1 (DESCRIPTION OF COBALT/MOLYBDENUM CONTAINING CATALYST COMPOSITIONS)

This Example 1 presents details regarding the inventive cobalt/molybdenum catalyst composition (Catalyst A) and the comparison cobalt/molybdenum catalyst compositions (Catalyst B and Catalyst C) and methods used to prepare these compositions.

A commercially available alumina carrier was used in the preparation of the catalyst compositions of this Example I. The following Table 1 presents the typical physical properties of the alumina carrier that was used in the preparations.

TABLE 1

| Typical Alumina Carrier Properties | |
|---|---|
| Property | Value |
| Compacted Bulk Density (g/cc) | 0.49 |
| Water Pore Volume (cc/g) | 0.868 |
| BET Surface Area (m2/g) | 300 |
| Median Pore Diameter by Volume (angstroms) | 91 |

The metal components of the catalyst were incorporated into the carrier by the incipient wetness impregnation technique to yield the following metals composition (oxide basis): 14.8% Mo, 4.2% Co, 2.4% P. The impregnation solution included 13.13 weight parts phosphoric acid (27.3% P), 13.58 weight parts cobalt carbonate (46.2% Co), and 33.09 weight parts Climax molybdenum trioxide (62.5% Mo). The total volume of the resulting solution at ambient was equal to 98% of the Water Pore Volume of 100 weight parts of the alumina support to provide a metal-incorporated support material.

The impregnated carrier or metal-incorporated support material was then dried at 125° C. (257° F.) for a period of several hours to give a dried intermediate having an LOI of 8 wt % and a water pore volume of 0.4 cc/g.

Aliquot portions of the dried intermediate were then each impregnated with a selection of one of the following additives or additive mixtures to fill 95% of the pore volume of the dried intermediate: ethyl acetoacetate (EAA) yielding Catalyst A; 100% of propylene carbonate (Sigma Aldrich) yielding Catalyst B; and a mixture of 50% dimethylformamide (DMF) and an olefin oil C18-30 yielding Catalyst C.

EXAMPLE 2 (CATALYST ACTIVITIES UNDER VERY LOW PRESSURE REACTION CONDITIONS)

This Example 2 presents the results of hydrodesulfurization (HDS) activity performance testing for Catalyst A, Catalyst B, and Catalyst C when used in the processing of a straight run gas oil feedstock (SRGO).

Pilot plant tests were performed comparing the HDS activities of Catalyst A, Catalyst B, and Catalyst C used under the process conditions shown in Table 2. The feed used in the tests was a SRGO (Straight Run Gas Oil).

TABLE 2

Test Process Conditions

| | Conditions |
| --- | --- |
| Pressure (psig) | 300 |
| LHSV (hr$^{-1}$) | 0.75 |
| H$_2$/Oil (SCF/bbl) | 1200 |
| Target S Level (wppm) | 10 |

A summary of the ULSD HDS activity testing results is shown in FIG. 1. These plots show the weighted average bed temperature (WABT) for each of Catalyst A, Catalyst B, and Catalyst C over the run time in hours. The WABT was controlled so as to provide a product having a sulfur content of 10 ppmw.

The results show that the inventive Catalyst A exhibited a significantly greater ULSD HDS activity over the ULSD HDS activity exhibited by Catalyst B or Catalyst C. The WABT for Catalyst A was as much as 10° F. less than the WABT for Catalyst C, and it ranged from 5 to 8° F. lower than the WABT for Catalyst B. This huge temperature difference demonstrates the significantly higher activity of the inventive catalyst over the activity of the comparison catalyst for hydrodesulfurization.

The improvement in the catalyst activity of inventive catalyst over the comparison catalysts is significant. This improvement allows for the processing of more difficult feedstocks or for the processing of feedstocks at higher throughput rates, or a combination of both. Moreover, the difficult feedstock processing or higher feed throughput rates can successfully be performed under the more challenging very low-pressure reaction conditions.

It will be apparent to one of ordinary skill in the art that many changes and modifications may be made to the invention without departing from its spirit and scope as set forth herein.

That which is claimed is:

1. A catalyst composition comprising: a calcined shaped support material that is impregnated by a single impregnation step with a cobalt or nickel component, a molybdenum component, and a phosphorous component and dried without calcination and incorporated with an acetoacetic acid compound additive, wherein the catalyst composition is non-sulfurized.

2. A catalyst composition as recited in claim 1, wherein said catalyst composition further comprises a material absence of a hydrocarbon oil.

3. A catalyst composition as recited in claim 1, wherein said molybdenum component is present in said catalyst composition in an amount in the range of from 5 wt. % to 50 wt. % and said cobalt or nickel component is present in said catalyst composition in an amount in the range of from 0.5 wt. % to 20 wt. %.

4. A catalyst composition as recited in claim 1, wherein said acetoacetic acid compound additive is selected from the group of compounds having the following molecular structural formula: R1-O—CO—CR3R4-CO—R2

Wherein: R1=either hydrogen or a C1 to C4 alkyl group;
R2=a C1 to C4 alkyl group;
R3=either hydrogen or a C1 to C4 alkyl group;
R4=either hydrogen or a C1 to C4 alkyl group.

5. A catalyst composition as recited in claim 4, wherein said acetoacetic acid compound additive is selected from the group consisting of acetoacetic acid, ethyl acetoacetic acid, methyl acetoacetic acid, and ethyl 2-methyl acetoacetic acid.

6. A process for hydrotreating a hydrocarbon feedstock, wherein said process comprises: contacting under suitable hydrotreating process conditions said hydrocarbon feedstock with the catalyst composition recited in claim 1; and yielding a treated product.

7. A method of making a composition, wherein said method comprises:
providing a calcined shaped particle comprising an inorganic oxide material;
impregnating by a single impregnation step said calcined shaped particle with a metal-containing aqueous solution, comprising a molybdenum metal component, a cobalt or nickel component, and a phosphorous component to incorporate into said calcined shaped particle cobalt or nickel in an amount in the range of from 0.5 wt. % to 20 wt. % and molybdenum in an amount in the range of from 5 wt. % to 50 wt. %, based on a dry support and the metal component as the element, regardless of its actual form, to provide a metal-incorporated support material;
drying said metal-impregnated support material under a drying temperature that is less than a calcination temperature not exceeding 400° C. to provide a dried metal-impregnated support material;
incorporating an acetoacetic acid compound additive into said metal-incorporated support material to thereby provide an additive-impregnated composition; and
wherein the additive-impregnated composition is non-sulfurized.

8. A method as recited in claim 7, further comprising: contacting said additive-impregnated composition under suitable hydrogen treatment conditions with hydrogen to thereby provide a hydrogen-treated composition.

9. A method as recited in claim 8, wherein prior to said incorporating of said acetoacetic acid compound additive into said metal-incorporated support material, said metal-incorporated support material is dried so as to contain a volatiles content in the range of from 3 to 20 wt. % LOI.

10. A composition made by the method of claim 7.

* * * * *